(12) United States Patent
Kotera

(10) Patent No.: US 6,186,921 B1
(45) Date of Patent: Feb. 13, 2001

(54) ROCKER JOINT SILENT CHAIN HAVING A JOINT PIN THICKER THAN A CORRESPONDING ROCKER PIN

(75) Inventor: Tetsuji Kotera, Nabari (JP)

(73) Assignee: Borg-Warner Automotive K.K. (JP)

( * ) Notice: Under 35 U.S.C. 154(b), the term of this patent shall be extended for 0 days.

(21) Appl. No.: 09/311,533

(22) Filed: May 13, 1999

(30) Foreign Application Priority Data

Jun. 22, 1998 (JP) .................................................. 10-192364

(51) Int. Cl.$^7$ .................................................. F16G 13/06
(52) U.S. Cl. .......................................... 474/215; 474/212
(58) Field of Search .................................. 474/202, 206, 474/212, 213, 214, 215

(56) References Cited

U.S. PATENT DOCUMENTS

| | | | |
|---|---|---|---|
| 799,073 | * | 9/1905 | Morse ................................. 474/215 |
| 1,405,145 | * | 1/1922 | Morse ................................. 474/215 |
| 1,651,832 | * | 12/1927 | Morse ................................. 474/215 |
| 1,755,887 | * | 4/1930 | Morse ................................. 474/215 |
| 1,822,749 | | 9/1931 | Rothman ............................. 474/215 |
| 1,849,684 | * | 3/1932 | Morse ................................. 474/215 |
| 1,868,334 | * | 7/1932 | Morse ................................. 474/215 |
| 2,067,243 | * | 1/1937 | Perry ................................. 474/215 |
| 2,096,061 | * | 10/1937 | Perry ................................. 474/215 |
| 2,653,485 | | 9/1953 | MacArthur ........................... 74/253 |
| 3,043,154 | * | 7/1962 | Karig et al. ......................... 474/215 |
| 3,213,699 | | 10/1965 | Terepin ............................... 74/251 |
| 3,742,776 | | 7/1973 | Avramidis ......................... 74/251 S |
| 4,010,656 | | 3/1977 | Jeffrey .............................. 74/245 S |
| 4,186,617 | | 2/1980 | Avramidis et al. ................. 74/245 S |
| 4,345,904 | | 8/1982 | Numazawa et al. ................. 474/215 |
| 4,737,137 | | 4/1988 | Miyaishi ............................. 474/245 |
| 4,758,210 | | 7/1988 | Ledvina ............................. 474/212 |
| 4,764,158 | | 8/1988 | Honda et al. ....................... 474/212 |
| 4,801,289 | | 1/1989 | Sugimoto et al. ................... 474/215 |
| 4,904,231 | | 2/1990 | Zimmer ............................. 474/214 |
| 4,911,682 | | 3/1990 | Ivey et al. ......................... 474/245 |
| 5,026,331 | | 6/1991 | Sugimoto et al. ................... 474/214 |
| 5,236,399 | | 8/1993 | Sugimoto et al. ................... 474/215 |
| 5,236,400 | | 8/1993 | Tsuyama ............................. 474/217 |
| 5,242,333 | | 9/1993 | Sugimoto et al. ................... 474/212 |
| 5,242,334 | | 9/1993 | Sugimoto et al. ................... 474/215 |
| 5,372,554 | | 12/1994 | Okuda ............................... 474/206 |
| 5,628,702 | | 5/1997 | Kotera ............................... 474/213 |
| 5,651,746 | | 7/1997 | Okuda ............................... 474/215 |

FOREIGN PATENT DOCUMENTS

| | | | |
|---|---|---|---|
| 645727 | * | 7/1928 | (FR) ............................... 474/215 |
| 663693 | * | 4/1929 | (FR) ............................... 474/215 |
| 62-101940 | | 5/1987 | (JP) . |
| 5-22666 | | 12/1988 | (JP) . |
| 1-55821 | | 1/1989 | (JP) . |

OTHER PUBLICATIONS

European Search Report in EPO 99303938.7, dated Oct. 18, 1999.

\* cited by examiner

Primary Examiner—Thomas R. Hannon
(74) Attorney, Agent, or Firm—Sidley & Austin; Greg Dziegielewski

(57) ABSTRACT

In a silent chain, multiple link plates are interleaved and connected to each other by connecting pins in a rocker joint. The rocker joint includes a joint pin and a rocker pin which are inserted into pin apertures. Guide links are placed on both ends of the joint pins. The joint pins are slightly longer than the rocker pins. Each rocker pin and joint pin has a cross-sectional area. The cross-sectional area of the joint pin is made larger than that of the rocker pin. In another embodiment, the rocker joint has a joint pin with a greater thickness than that of the rocker pin. Another embodiment of the invention includes a rocker joint where the radius of the curvature of the rolling surface of the joint pin is greater than that of the rocker pin.

5 Claims, 4 Drawing Sheets

ROCKER JOINT SILENT CHAIN HAVING A JOINT PIN THICKER THAN A CORRESPONDING ROCKER PIN

Reference is made to U.S. Pat. No. 5,628,702, to the same inventor, which is incorporated herein by reference.

BACKGROUND OF THE INVENTION

The present invention relates to a silent chain, or chain with links having inverted teeth. More particularly, the invention related to a silent chain with a rocker-joint and, in particular, to a rocker joint having improved resistance to fracture as a result of usage and wear.

Generally, silent chains are used with sprockets as the power transmission chain in transmissions, transfer cases, engine timing systems, and the like, for automobiles and motorcycles. Silent chains are formed by the assembly of rows of link plates in transverse and longitudinal directions. Conventionally, the direction along the length of chain as it travels between the sprockets is referred to as the longitudinal direction. The links are interlaced and joined by connecting pins. Each link plate has a pair of teeth and a pair of pin apertures. The links are connected to each other by connecting pins inserted in each pin aperture. Guide links are utilized to maintain the chain on the sprockets when the chain is wrapped around the sprockets during operation. Guide link plates are typically installed in the center or at both outer edges of the row of link plates arranged in the lateral direction. The guide links are conventionally press fit over pins, which connect the interlaced inside or articulating links. Guide links typically do not include inverted teeth.

Conventionally, a rocker joint is used as the connecting pin. The rocker joint is comprised of a pair of long and short pins, i.e., a rocker pin and a joint pin that is longer than the rocker pin and both ends of which are fixed to guide links. The pins connect the links across the width of the chain in the transverse direction, i.e., at right angles to the longitudinal direction.

Damage to a chain may first occur during the press-stress operation, where the newly-assembled chain is subjected to a high load. During the pre-stress operation, cracks may be formed in a link plate or pin shortening the operational life of the chain. After undergoing normal usage and wear, the silent chain typically fails due to fracture of the connecting pin due to the rocker joint structure. This fracture often occurs at the attachment of the guide link to the rocker joint, where the effective cross-sectional area of the rocker joint decreases.

Examined Japanese Patent Application 1-55821 proposes a silent chain in which the joint pin is reinforced by placing one link plate on the inside of the guide link to prevent contact damage or breakage of the joint pin. However, in this case, the overall width of the chain is increased by the thickness of the additional link plate. Therefore, the most effective means to prevent breakage of the joint pin without increasing the chain width is to increase the cross-sectional area of the overall rocker joint and to decrease the shear stress that acts on the joint pin.

Another prior art patent has proposed the silent chain disclosed in Japanese Laid-Open Patent 6-207643. In this silent chain, the pin aperture formed in the link plate has a long-circular shape to increase the cross-sectional area of the overall rocker joint, which includes a rocker pin and joint pin. The aperture results in the increased breaking strength of the joint pin. However, the special shape of the pin aperture must be formed in the link plate.

The present invention provides an improved silent chain by increasing the wear resistance of the joint pin without employing a special pin aperture shape.

SUMMARY OF THE INVENTION

The silent chain of one embodiment of the present invention comprises multiple link plates, each having an aperture formed at each end thereof. The link plates are connected to one another by rocker pins and joint pins received in the apertures. The joint pins are longer than the rocker pins. Guide links are press fit on both ends of the joint pins. The cross-sectional area of the joint pins is larger than that of the rocker pins.

The silent chain of a second embodiment of the present invention has a joint pin that has a thickness that is greater than that of the rocker pin.

In the silent chain of a third embodiment of the present invention, the center of the curvature of the rolling surface of the joint pin and the center of curvature of the rolling surface of the corresponding rocker pin are asymmetrical with respect to the centerline of the aperture and the radius of the curvature of the rolling surface of the joint pin is greater than that of the rocker pin.

In the present invention, the breaking strength of the joint pin is increased without employing a special pin-aperture shape because the cross-sectional area of the joint pin is made larger than that of the rocker pin.

Although the cross-sectional shape of the rocker pin is relatively smaller because the cross-sectional area of the joint pin is increased, in the case of the rocker pin, its overall effective cross-sectional area is not changed. Even if the cross-sectional area of the rocker pin is decreased, the corresponding cross-sectional area of the joint pin is increased by the same amount so that the shear stress is borne across the rocker pin in cooperation with the joint pin. Therefore, the shear stress generated in the rocker pin changes very little, even if the cross-sectional area of the rocker pin is decreased and, as a result, the breaking strength of the rocker pin is maintained.

For a better understanding of these and other aspects and objects of the invention, reference should be made to the following detailed description taken in conjunction with the accompanying drawings.

DETAILED DESCRIPTION OF THE PREFERRED EMBODIMENTS

Figure 1:
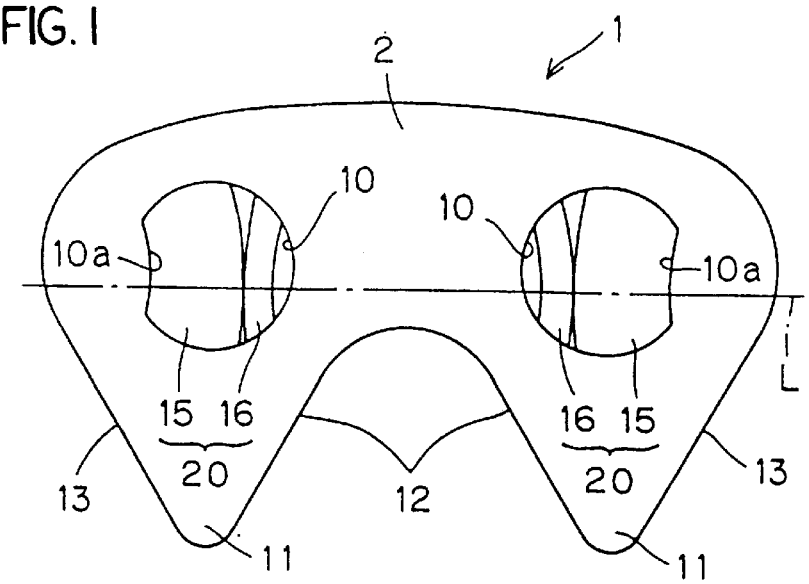
FIG. 1 is a front view of the link plate of a silent chain of an embodiment of the present invention.

The present invention is explained below with reference to the embodiments illustrated by the attached figures. As shown in FIG. 1, silent chain 1 of a first embodiment of the present invention is mainly composed of link plates 2 and rocker joint 20. The rocker joint acts as the connecting pin which connects laminated multiple link plates 2. Link plate 2 has a pair of pin apertures 10 and a pair of teeth 11 which are formed below the apertures. Each pin aperture 10 is a round hole having seating surface 10a on the side of the link plate end. Each tooth 11 is composed of inside flank 12 and outside flank 13.

Rocker joint 20 is inserted into each pin aperture 10. Rocker joint 20 is composed of joint pin 15 with a large cross-sectional area (i.e., of relative large material thickness) and rocker pin 16 with a small cross-sectional area (i.e., of relative small material thickness). That is, the cross-section of joint pin 15 is larger than that of rocker pin 16 and the cross-sections of both pins 15 and 16 are asymmetrical in each pin aperture 10. The joint pin 15 and rocker pin 16 each have a longitudinal axis (not shown) transverse (or perpendicular) to the longitudinal length of the chain. The longitudinal direction is the direction of motion of the chain as it travels between the two sprockets. The cross-sectional area of each pin is defined as the area in a plane perpendicular to the longitudinal axis of each pin.

Incidentally, one-dot line L in FIG. 1 indicates a pitch line that connects the contact point of joint pin 15 and rocker pin 16 when the chain is stretched into the straight-pull position. The straight-pull position is defined as the position of the links when tightly pulled in the tight strand of the chain between the sprockets, or when the links are tightly pulled during a preloading operation. The thickness of each pin is determined by measuring the width of the pin along the line L.

Figure 2:
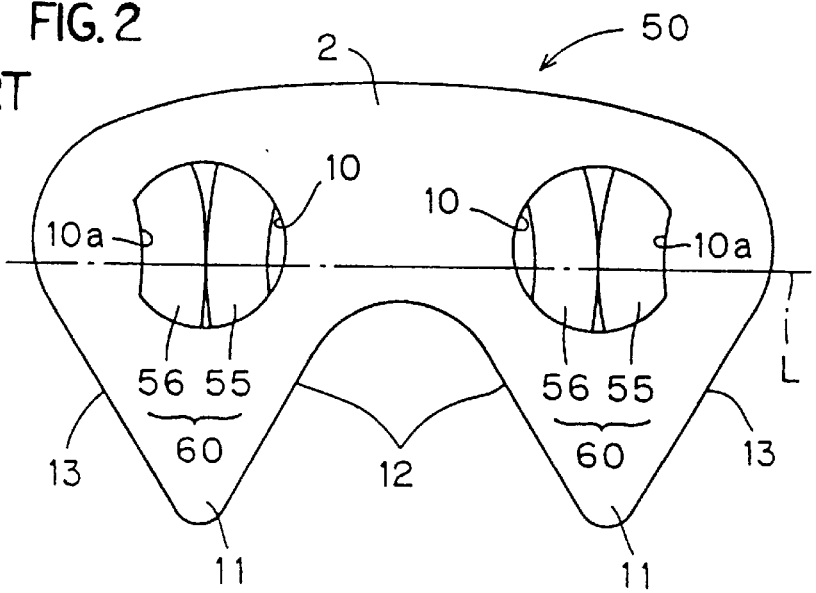
FIG. 2 is a front view of the link plate of a conventional silent chain of the prior art.

A conventional silent chain is shown in FIG. 2 for reference purposes. As shown in the figure, conventional silent chain 50 has link plates 2 of the same shape as that of the present invention, except joint pin 55 and rocker pin 56, of the same cross-sectional shape, are inserted in pin aperture 10 of this link plate 2. The rocker joint 60 is composed of joint pin 55 and rocker pin 56.

Figure 4:
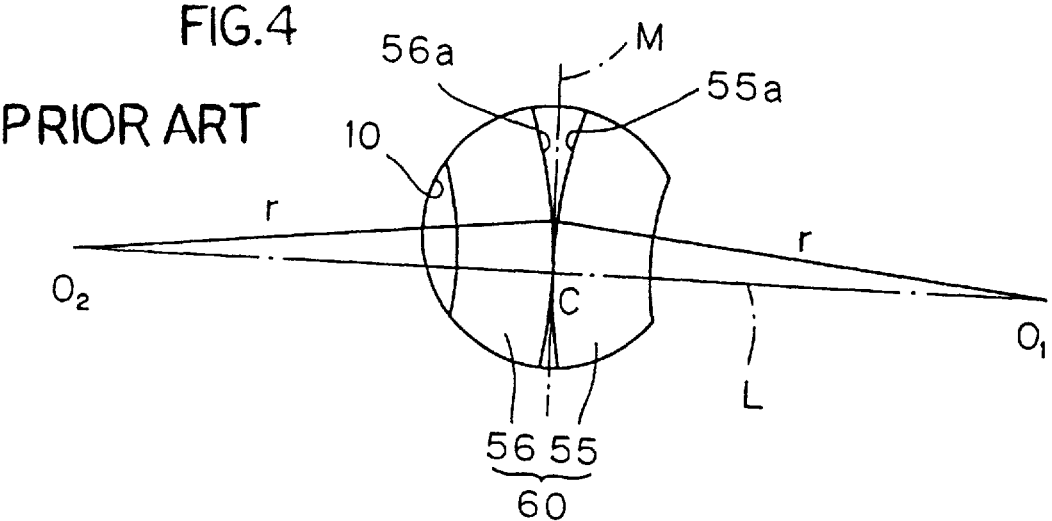
FIG. 4 is an enlargement showing the pin aperture of the link plate of a conventional silent chain of the prior art.

FIG. 4 is an enlargement of pin aperture 10 of conventional link plate 2. As shown in the figure, cross-sectional shapes of prior art joint pin 55 and rocker pin 56 are symmetrical with respect to the centerline M of pin aperture 10 within each pin aperture 10. Rocker surface (rolling surface) 55a of joint pin 55 is formed by an arc surface of radius centered around joint $0_1$ on pitch line L, and rocker surface (rolling surface) 56a of rocker pin 56 is formed by an arc surface of radius centered around point $0_2$ on pitch line L. Therefore, centers $0_1$ and $0_2$ are symmetrical on both sides of contact point C of rocker surfaces 55a and 56a. That is:

$$\overline{O_1C} = \overline{O_2C} = r$$

Figure 3:
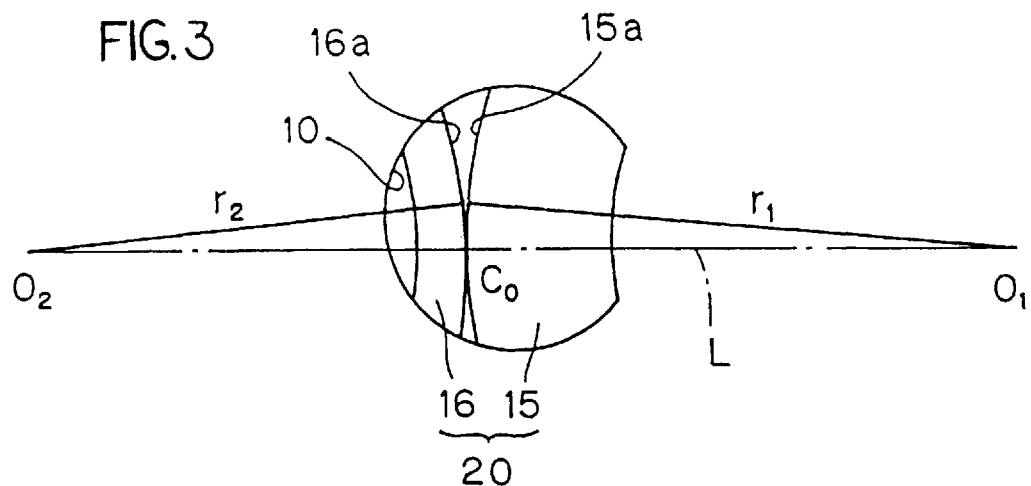
FIG. 3 is an enlargement showing the pin aperture of the link plate of a silent chain of another embodiment of the present invention.

FIG. 3 shows an enlargement of pin aperture 10 of link plate 2 of the present invention. In the figure, the same reference numbers as in FIG. 4 show the same or corresponding parts. Here, rocker surface 15a of joint pin 15 is formed by an arc surface of radius $r_1$ centered around point $0_1$ on pitch line L and rocker surface 16a of rocker pin 16 is formed by an arc surface of radius $r_2$ centered around point $0_2$ on pitch line L. Incidentally, the positions of $0_1$ and $0_2$ are the same as FIG. 4. Therefore, contact point $C_0$ of rocker surfaces 15a and 16a on pitch line L can be expressed as:

$$\overline{O_1C_0} = r_1 > \overline{O_2C_0} = r_2$$

In a preferred embodiment, the rocker 16 and pin 15 both are generally C or D-shaped each with a front contacting surface 16a, 15a and a corresponding back surface being parallel arcuate surfaces.

Figure 5:
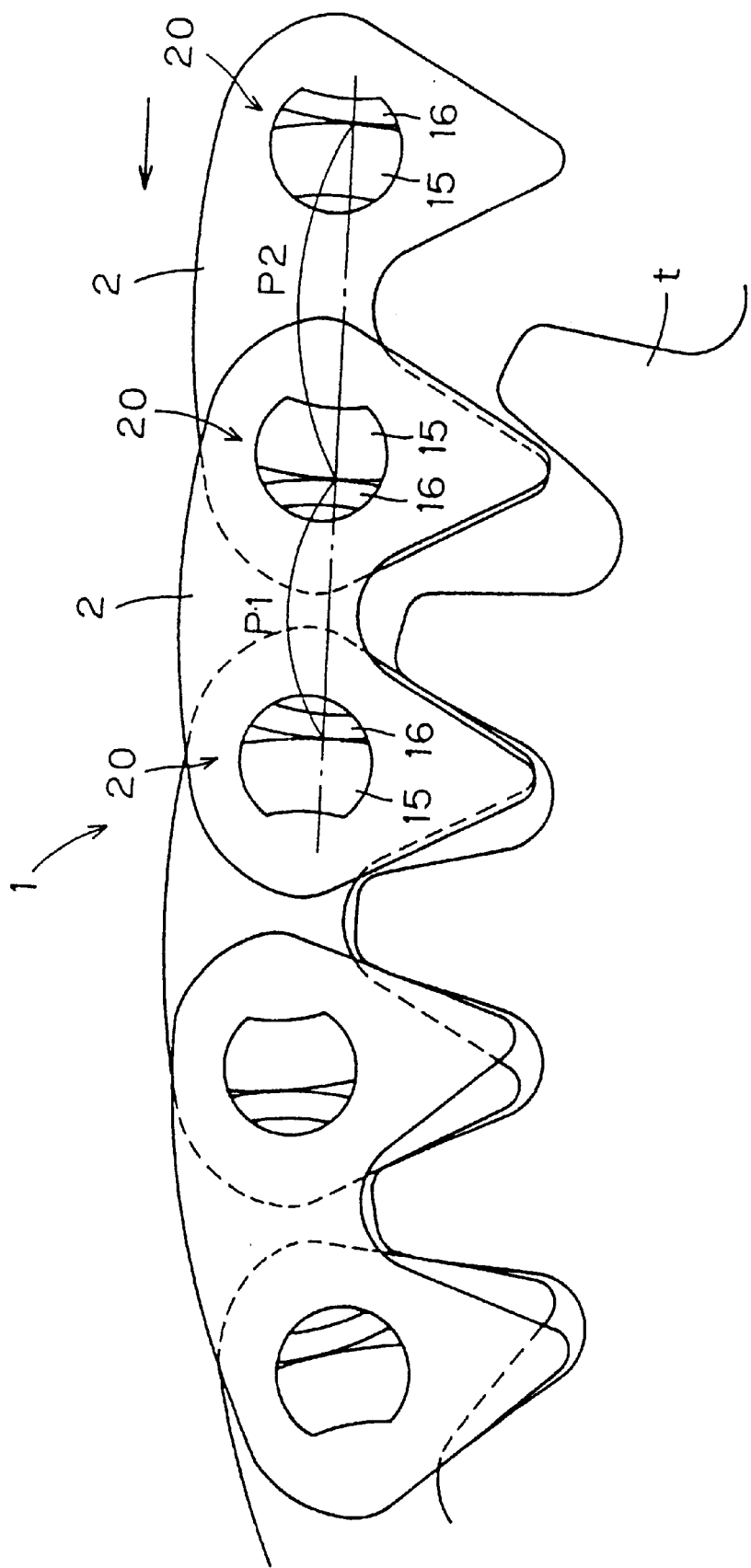
FIG. 5 shows the meshing of the silent chain of another embodiment of the present invention, with sprocket.

FIG. 5 shows the meshing of a silent chain of the present invention with a sprocket. In the figure, silent chain 1, is traveling on a straight line from right to left in the figure, and it meshes with sprocket teeth t, which are moving in a counter-clockwise direction. As shown in FIG. 5, silent chain 1 is composed of an alternate combination of chain pitches $P_1$ and $P_2$ ($>P_1$)

Figure 6:
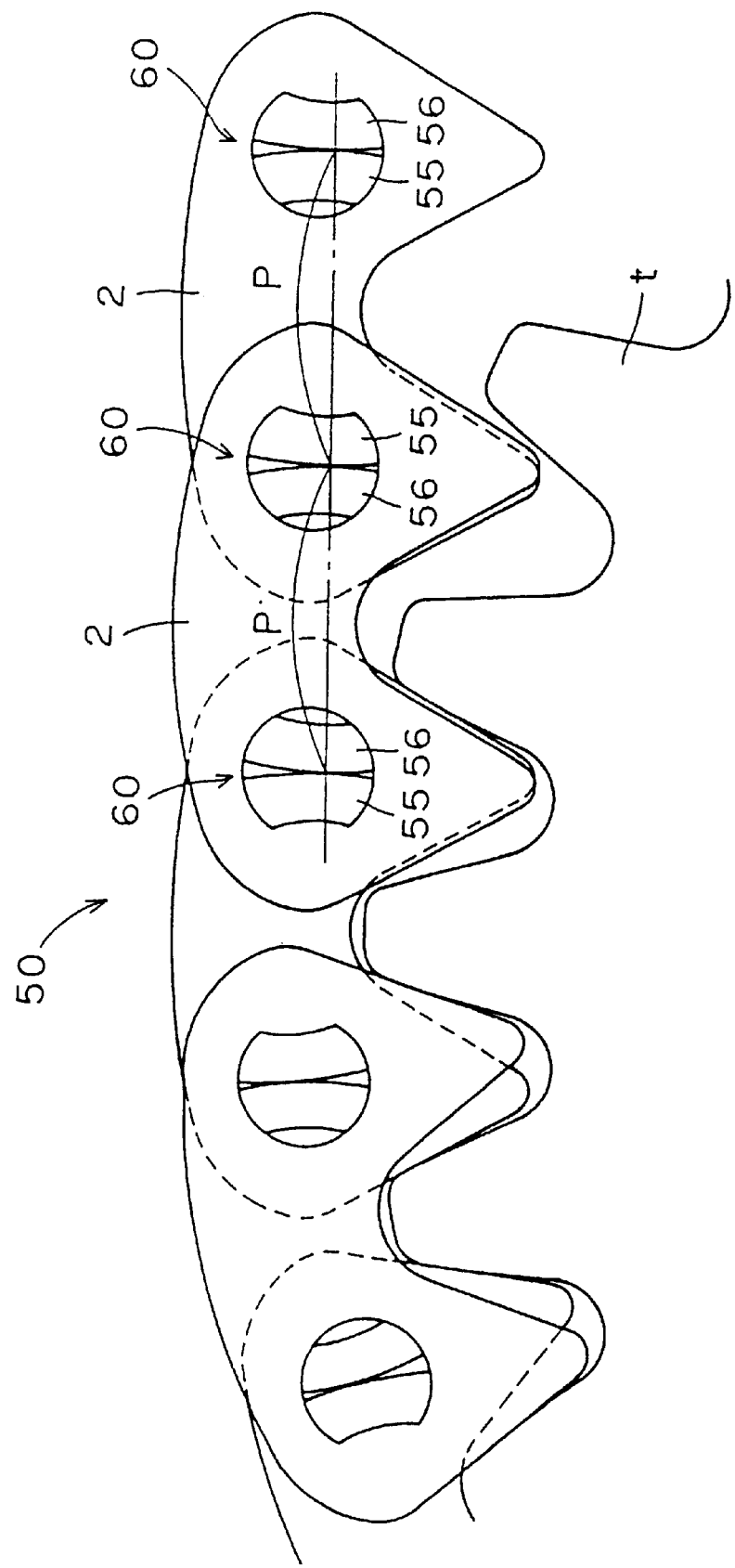
FIG. 6 shows the meshing of a conventional silent chain of the prior art with a sprocket.

FIG. 6 shows the meshing of a conventional silent chain with a sprocket for reference purposes. In the figure, silent chain 50, moving in a straight line from right to left, meshes with sprocket teeth t and this conventional silent chain 50 is composed of the combination of chain pitch P.

According to the present invention, the breaking strength of joint pin 15 can be increased without a special shape of pin aperture 10 because the cross-sectional area of joint pin 15 is made larger than that of rocker pin 16.

Although the cross-sectional shape of rocker pin 16 becomes relatively smaller when the cross-sectional shape of joint pin 15 is increased, the overall effective cross-sectional area of rocker pin 16 does not change even if the cross-sectional area of the rocker pin decreases. As long as the cross-sectional area of joint pin 15 increases by a similar amount, the shear stress is borne across its entire length in cooperation with joint pin 15. Therefore, the shear stress generated in rocker pin 16 changes little even if the cross-sectional area of rocker pin 16 decreases, and, as a result, the breaking strength of rocker pin 16 is maintained.

As shown above, with the silent chain of this invention, the breaking strength of the joint pin can be increased without use of a special pin aperture shape because the cross-sectional shape of the joint pin is made larger than that of the rocker pin.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A silent chain comprising:
    a plurality of interleaved link plates, said link plates having apertures formed at each end thereof, said link plates being connected with one another by rocker pins and joint pins received in said apertures, said rocker pins having an arcuate rolling surface defined by a first radius formed from a first center of curvature and a corresponding arcuate back surface, said joint pins having an arcuate rolling surface defined by a second radius formed from a second center of curvature and a corresponding arcuate back surface, said joint pins being longer than said rocker pins in a longitudinal direction of said pins, said first and said second centers of curvature being on opposite sides of said rolling surfaces, guide links being press fit on both ends of said joint pins, said rocker pins having a first cross-sectional area, said joint pins having a second cross-sectional area, said second cross-sectional area of each of said joint pins being larger than said first cross-sectional area of said rocker pins.

2. The silent chain of claim 1 wherein said joint pin has a first thickness, said rocker pin having a second thickness, said thickness being defined as the width of the pin measured along the pitch line of the chain when in a straight-pull position, said first thickness of each of said joint pins being greater than said second thickness of said rocker pins.

3. The silent chain of claim 1 wherein said rolling surface of said rocker pin and said rolling surface of said joint pin contact each other at a contact point along the pitch line of the chain when said chain is in the straight-pull position, said aperture having a vertical centerline passing through said contact point, said first center of curvature of said rolling surface of said joint pin and said second center of curvature of said rolling surface of said corresponding rocker pin being located at different distances along said pitch line from said centerline of said aperture, and said first radius of curvature of said joint pin being greater than said second radius of curvature of said rocker pin.

4. The silent chain of claim 1 wherein each said rocker pin has a corresponding arcuate back surface equally spaced from said arcuate rocker pin rolling surface along the entire cross-sectional area of said rocker pin.

5. The silent chain of claim 1 wherein each said joint pin has a corresponding arcuate back surface equally spaced from said arcuate joint pin rolling surface along the entire cross-sectional area of said joint pin.

* * * * *